COMPUTER WITH DETACHABLE REGISTERS

Filed Feb. 25, 1952 2 Sheets-Sheet 1

INVENTOR
NORMAN BROWN
By [signature] Atty

Nov. 9, 1954

N. BROWN 2,693,911

COMPUTER WITH DETACHABLE REGISTERS

Filed Feb. 25, 1952

2 Sheets-Sheet 2

INVENTOR
NORMAN BROWN
By [signature]
Atty.

2,693,911

COMPUTER WITH DETACHABLE REGISTERS

Norman Brown, Newcastle-on-Tyne, Northumberland, England

Application February 25, 1952, Serial No. 273,214

Claims priority, application Great Britain March 6, 1951

7 Claims. (Cl. 235—74)

This invention relates to computing machines of the kind comprising a computing mechanism consisting of a train of coacting discs or wheels corresponding to quantities which are multiples of each other, the discs or wheels being arranged in ascending order of magnitude. Computing machines of this kind have been used for the computation of wages paid to workmen and in this connection the computing mechanism conveniently comprises a disc adapted to register farthings, a disc adapted to register pence, a disc adapted to register shillings, and a number of discs adapted to register pounds and powers of ten in pounds, the discs coacting in known manner as by the provision of cogs or teeth on the peripheries of the discs.

The object of the present invention is to provide a machine by means of which quantities can be recorded simultaneously on a number of computing mechanisms of the kind described, so that if a number of quantities are recorded, the total is recorded on each computing mechanism. Another object of the invention is to provide for the computing mechanism to be interchangeable so that an unlimited number of totals may be obtained. Such a machine would be of value for example in the case of a firm having a number of departments when it is desired to keep a record of the wages paid to the individual workers, a record of wages paid in each department, and a record of the total wages paid.

According to the invention, a computing machine comprises a number of computing mechanisms of the kind described, and a common driving mechanism with which each of said computing mechanisms may be interchangeably associated, or with which any number of said computing mechanisms may be interchangeably associated simultaneously, whereby a quantity determined by the actuation of the driving mechanism is recorded by the computing mechanism or mechanisms associated with the driving mechanism at the time.

The driving mechanism may consist of a plurality of independently rotatable cylinders provided with longitudinal teeth, the various computing mechanisms being adapted to be brought into register with the driving mechanism in mutually parallel positions at right angles to the driving mechanism, said computing mechanisms having toothed wheels for coaction with the teeth of the driving mechanism.

The computing mechanisms advantageously each consist of a train of toothed discs rotatably mounted in a flat casing having an open side through which the discs are exposed and may be brought into engagement with the toothed cylinders by locating the casing at right angles to the longitudinal axes of said cylinders. In order to facilitate the accurate location of the computing mechanisms, the said casings may be provided at each end with short rods which may be forced into spring clips attached to fixed vertical members of the machine. In order to secure the necessary coaction between the discs of each computing mechanism, each disc of each computing mechanism except the last disc corresponding to the highest power, is formed or provided with a tooth offset with respect to the plane of the disc and extending beyond the outer periphery of the disc in order to engage once on each revolution one of a number of teeth upstanding from the face of each disc except the first corresponding to the lowest power. In this case, indentations are formed in the toothed cylinders to allow free passage to said offset teeth.

The means for actuating the toothed cylinders constituting the driving mechanism preferably consist of toothed bars which engage sprockets loosely mounted on the cylinder shafts, said sprockets carrying pawls which in one direction of rotation of the sprockets are in driving engagement with ratchet wheels fixedly secured to the cylinder shafts while allowing the sprockets to rotate freely in the opposite direction of rotation of the sprockets. The toothed bars may be operated against the action of springs which return the bars to their normal position after each operation.

One embodiment of the invention will now be described by way of example with reference to the accompanying drawings, wherein.

The driving mechanism consists of a plurality of cylinders 1 which are vertically disposed and fixedly mounted on shafts 4 which are rotatably supported in bars 2 and 3 forming part of the fixed casing of the machine. Each of the cylinders 1 is formed or provided with longitudinal teeth 5, the number of teeth depending upon the system of notation of the quantities to be recorded. As shown, the cylinders are adapted for operation on the decimal system, being provided with ten teeth each. In the embodiment illustrated four such cylinders, $a^1$, $b^1$, $c^1$ and $d^1$, are provided, although it will be understood that a greater or lesser number may be provided as circumstances require.

Figure 1:
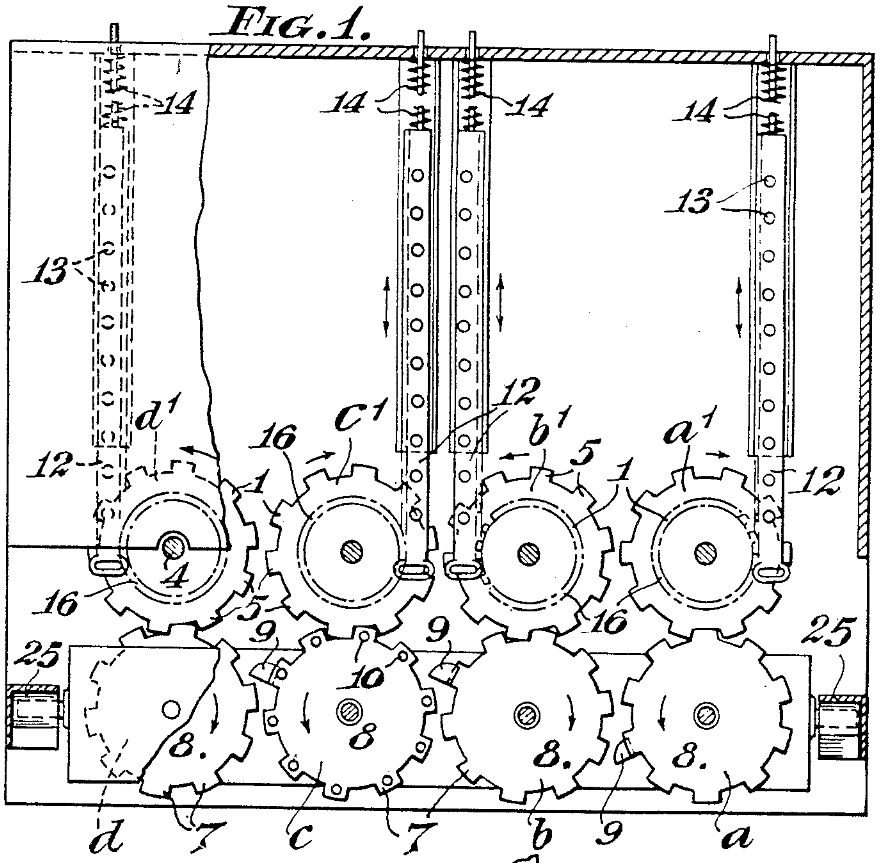
Figure 1 is a plan view of the machine with parts broken away.
Figure 3:
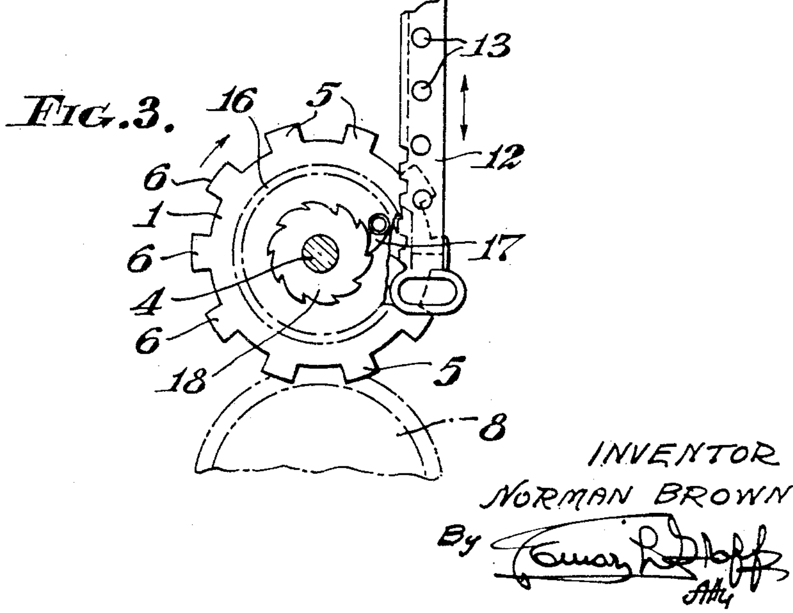
Figure 3 is a plan view showing the manner of actuating the driving mechanism.
Figure 2:
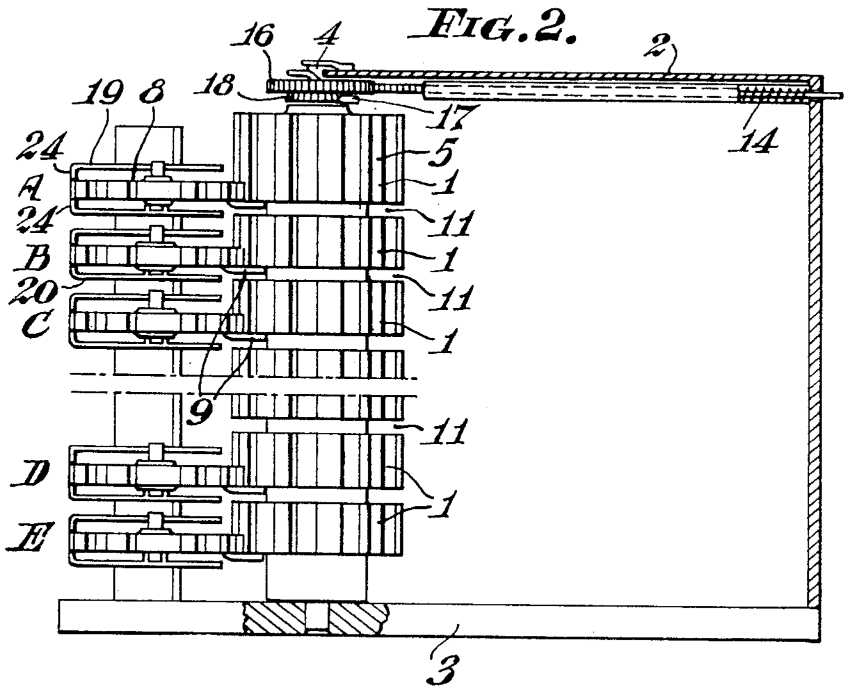
Figure 2 is a vertical section.
Figure 4:
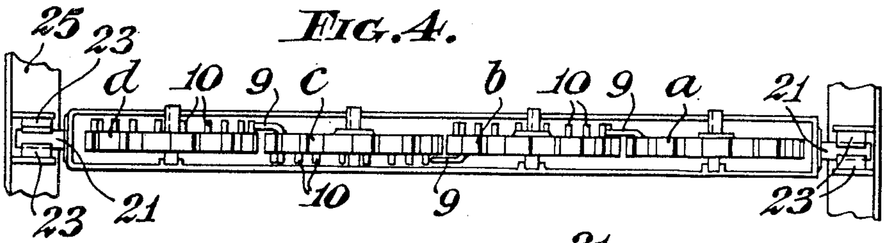
Figure 4 shows the method of positioning the computing mechanisms in co-operation with the driving mechanism.
Figure 5:
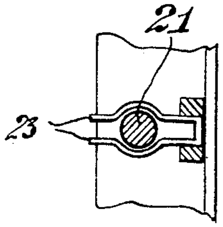
Figure 5 illustrates a detail of Figure 4.

The computing mechanisms each comprise a plurality of discs 8 having teeth 7 adapted to mesh with the teeth 5 of the cylinders 1. In the embodiment shown, four such discs or wheels, *a*, *b*, *c* and *d*, are provided. Each of the discs 8, except the last, is provided with an additional tooth 9 which is offset with respect to the plane of the discs 8 and is adapted upon each complete revolution of the disc to contact one of a number of teeth 10 upstanding from the adjacent disc 8 in order to record one unit on said disc. Thus, in the embodiment shown, teeth 9 are provided on the discs *a*, *b*, and *c*, while teeth 10 are provided on the discs *b*, *c* and *d*. In order that the teeth 9 shall not foul the cylinders 1, indentations 11 are formed in said cylinders for the passage of the teeth. The trains of discs *a*, *b*, *c* and *d*, are rotatably mounted between plates 19 and 20 which form an open-sided casing, the plates being formed with flanges 24 closing the front of said casing. In order to facilitate the location of the computing mechanisms in engagement with the driving mechanism, the casings are provided at their ends with short rods 21 which may be pressed into engagement with U-shaped springs 23 mounted on vertical members 25 of the casing of the machine. Five such mechanisms, A–E, are shown in Figure 2.

Means must be provided to actuate the cylinders 1 of the driving mechanism, and, as shown, such means comprise a number of toothed bars 12 which engage sprockets 16 loosely mounted on the cylinder shafts 4. The sprockets 16 each carry a pawl 17 which is adapted to engage the teeth of a ratchet wheel 18 fixed to each of the cylinder shafts 4, the arrangement being such that in one direction of movement of the bars 12, the cylinders 1 are rotated, while in the reverse direction of movement of the bars 12, the pawl 17 rides over the teeth of the ratchet wheel 18 without effecting its rotation. The bars 12 are formed with indentations 13 to facilitate their movement by the insertion of the fingers into the indentations 13, said movement taking place against the action of springs 14 which return the bars to their normal positions after each operation.

The method of using the machine will no doubt be apparent from the above description, but the following account of the method of computing wages in a factory will furnish a definite example.

Assuming mechanism A to be a mechanism on which the wages of a labourer are to be computed, there would be as many mechanisms A as there are labourers. Assuming mechanism B computes charges to a particular order or job, there would be as many mechanisms B as work orders or jobs it is desired to cost. The departments of the factory would each require a mechanism C and to compute the total wages a single mechanism D will be used.

Mechanisms A, B, C and D (one of each) are placed in position in engagement with the driving mechanism and the wages paid to worker registered on A, the same amount being recorded on B, C and D. The mechanism A is now replaced by a mechanism A corresponding to a different worker and his wages are recorded. In this case, the total of the wages paid to the two workers A is recorded on mechanisms B, C and D. It is now desired to record the wages of a third worker who has worked on a different job. In this case, mechanisms A and B, and where necessary C, are changed. At the end of a period therefore, we shall have a mechanism for showing the aggregate earnings of each worker, a mechanism showing the cost of each job, a mechanism showing the wages paid in each department, and, finally, one showing the total wages paid in the factory.

I claim:

1. A computing machine comprising a frame, a driving mechanism supported by said frame, said driving mechanism consisting of a plurality of independently rotatable cylinders provided with longitudinal teeth, a plurality of computing mechanisms each consisting of a flat casing having an open side, and a train of coacting toothed discs mounted within said casing and exposed through said open side, and means for detachably mounting said computing mechanisms on said frame so that said mechanisms are at right angles to said toothed cylinders and said toothed discs are in engagement with said toothed cylinders.

2. A computing machine comprising a frame, a driving mechanism supported by said frame, said driving mechanism consisting of a plurality of independently rotatable cylinders provided with longitudinal teeth, a plurality of flat casings having an open side, vertical members fixed on the frame parallel to said cylinders, spring clips on said vertical members, short rods at the ends of said flat casings, said rods being adapted to be forced into engagement with said spring clips so that said casings are disposed at right angles to said cylinders, and a plurality of computing mechanisms each consisting of a train of coacting toothed discs rotatably mounted in said flat casings through the open side of which the toothed discs are exposed for engagement with said toothed cylinders.

3. A computing machine according to claim 2, wherein each disc of each computing mechanism except the last disc corresponding to the highest power, is provided with a tooth offset with respect to the plane of the disc and extending beyond the outer periphery of the disc, each disc except the first corresponding to the lowest power being provided with a number of teeth upstanding therefrom, said offset tooth engaging one of said upstanding teeth on each revolution of said disc.

4. A computing machine according to claim 3, wherein indentations are formed in the toothed cylinders to allow free passage to said offset teeth.

5. A computing machine according to claim 2, comprising means for actuating the toothed cylinders, said means consisting of toothed bars, sprockets loosely carried by said cylinders and engaged by said toothed bars, pawls carried by said sprockets, and ratchet wheels fixedly secured to the cylinders, said pawls being in driving engagement with said ratchet wheels in only one direction of rotation of said sprockets.

6. A computing machine according to claim 5, comprising springs anchored on the frame and connected to said toothed bars, whereby the springs return the bars to their normal position after each operation.

7. A computing machine according to claim 5, wherein said bars are formed with indentations to facilitate their operation by the fingers.

References Cited in the file of this patent

UNITED STATES PATENTS

| Number | Name | Date |
|---|---|---|
| 1,283,959 | Surber | Nov. 5, 1918 |
| 1,302,509 | Carroll | May 6, 1919 |
| 2,374,760 | Lindstein | May 1, 1945 |